March 28, 1944.   O. M. JENSEN   2,345,261
POWER-DRIVEN HACK SAW MACHINE
Filed Sept. 20, 1941   2 Sheets-Sheet 1
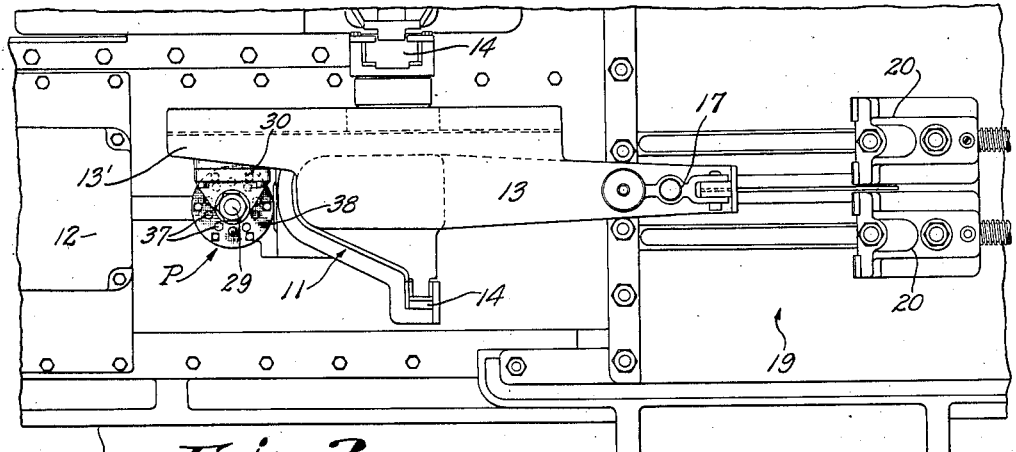
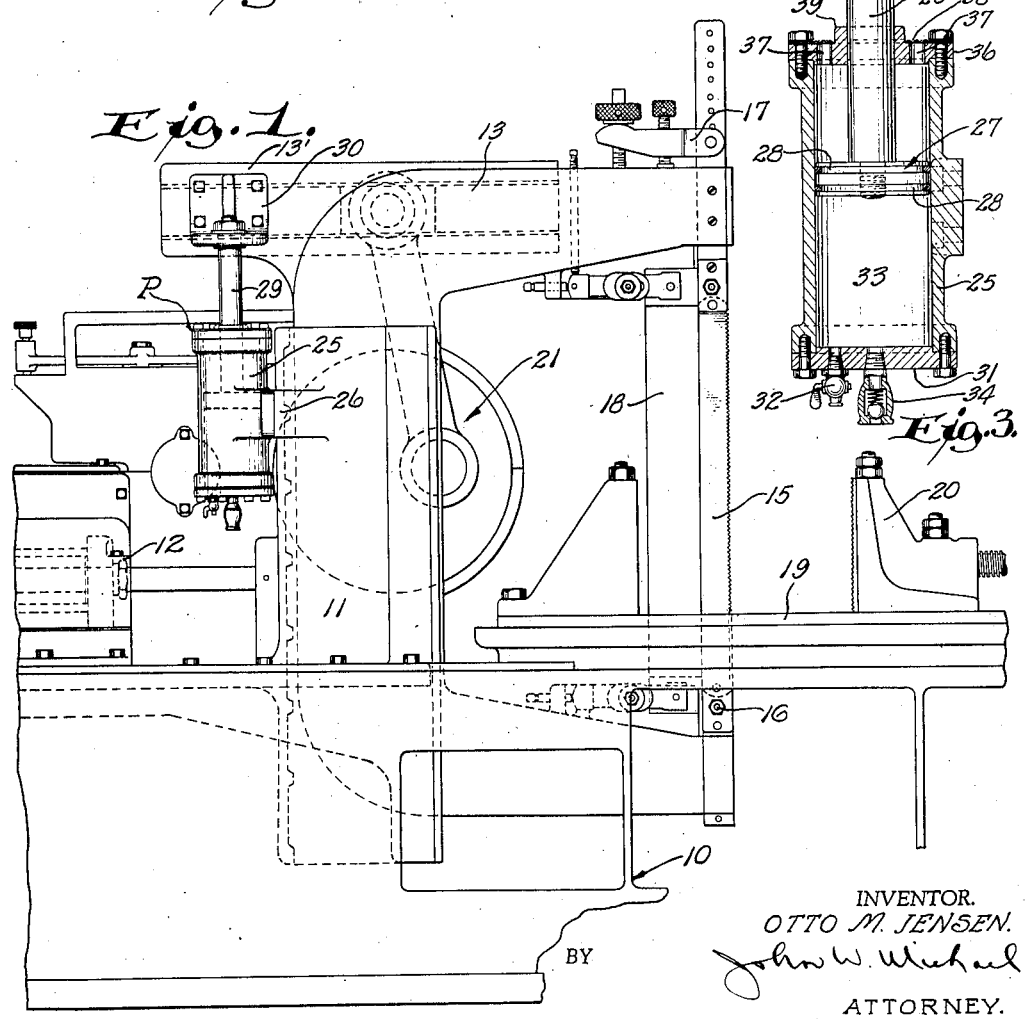
INVENTOR.
OTTO M. JENSEN.
BY
ATTORNEY.

March 28, 1944.    O. M. JENSEN    2,345,261
POWER-DRIVEN HACK SAW MACHINE
Filed Sept. 20, 1941    2 Sheets-Sheet 2

INVENTOR.
OTTO M. JENSEN.
BY John W. Michael
ATTORNEY.

Patented Mar. 28, 1944

2,345,261

UNITED STATES PATENT OFFICE 2,345,261

POWER-DRIVEN HACK SAW MACHINE

Otto M. Jensen, Racine, Wis., assignor to Peerless Machine Company, Racine, Wis., a corporation of Wisconsin Application September 20, 1941, Serial No. 411,662

2 Claims. (Cl. 29—74)

This invention relates to power-driven sawing machinery designed for heavy duty and of the hack saw type.

Machines of this character usually include a stationary frame, a carriage movably mounted thereon, a saw frame guided on the carriage for movement transversely with respect to the movement of the carriage, a saw secured to the saw frame, a motor, means driven by the motor for rapidly reciprocating the saw frame to impart sawing and return movements to the saw, and means for imparting feeding movement to the carriage to feed the saw into the work on the sawing stroke and to withdraw it slightly away from the work on each return stroke of the saw.

When designed for heavy duty, machines of this character necessarily employ a heavy stationary frame, a heavy carriage, and a heavy saw frame. The saw frame moves back and forth at a high velocity, and since its mass is substantial (of the order of three hundred pounds, for example) it acquires, on each stroke, a linear momentum of substantial magnitude. At the end of each stroke it must of course come to a complete stop and reverse its motion. This action tends to set up severe vibrations in the machine and in its foundation or support, especially if the machine is used, as it frequently is, on the upper floor of a building rather than on a solid, rigid, concrete foundation.

The object of the present invention is to provide a machine of this character, which is so constructed and organized that the saw frame, while still reciprocated at the same rapid rate, is brought to a smooth cushioned stop at the end of each stroke, thereby overcoming the tendency of the machine to vibrate or to set up vibrations in its supporting structure.

Another object of the invention is to provide a power-driven sawing machine of this character and having the advantage mentioned, and which utilizes the energy absorbed in bringing the saw frame to a smooth, cushioned stop at the end of each stroke for the purpose of accelerating the motion of the saw frame in an opposite direction on the next stroke.

Another object of the invention is to provide a power-driven sawing machine having these advantages and capacities, and which is simple and compact in construction, reliable, efficient, and durable in operation, and easy and comparatively inexpensive to manufacture.

Other objects and advantages reside in certain novel features of the construction, arrangement, and combination of parts, which will be herein- after more fully described and particularly pointed out in the appended claims, reference being had to the accompanying drawings forming a part of this specification, and in which:

Figure 1 is a fragmentary view in side elevation showing the invention embodied in a power-driven hack saw of the type wherein the saw frame is vertically reciprocated, parts being omitted for the sake of simplicity in illustration;

Figure 2 is a fragmentary view in top plan of the machine shown in Figure 1;

Figure 3 is a fragmentary detail view partly in side elevation and partly in central vertical cross section, illustrating the single-acting combination pneumatic brake and motor employed in the form of the invention shown in Figures 1 and 2;

Figure 4:
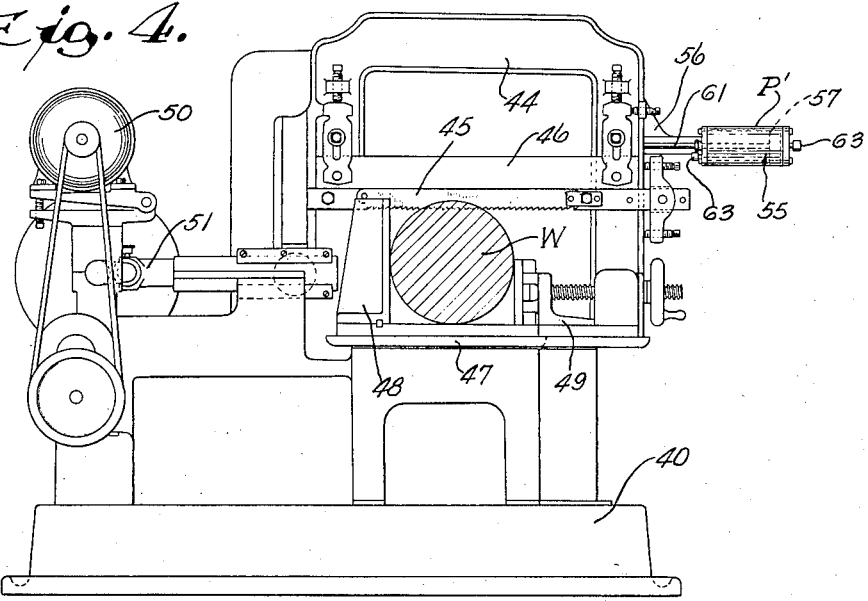
Figure 4 is a view in side elevation illustrating the invention embodied in a power-driven hack saw of the type wherein the saw frame and saw reciprocate horizontally, parts being omitted for the sake of simplicity in illustration.

Referring to the drawings, and more particularly to Figures 1 and 3, it is seen that the power-driven hack saw therein shown comprises generally a stationary frame 10 which is bolted or otherwise rigidly secured to a suitable foundation not shown. A carriage 11 is supported for horizontal reciprocatory movement in the usual horizontal guides or ways (not shown) provided therefor on the frame 10, and is fed back and forth by a power-driven feeding mechanism, designated diagrammatically at 12. A vertically reciprocable saw frame 13 is supported on the carriage 11 for bodily horizontal movement therewith while free to move up and down with respect thereto, this interconnection of the saw frame and carriage being accomplished by the usual vertical guides or ways 14.

A saw blade 15 is connected with the upper and lower end members of the saw frame 13 by the usual or any conventional or suitable connecting and tensioning means, designated at 16 and 17, and is backed up in the usual way by a back-plate 18.

The work to be cut is supported on a work table 19 and may be held in position by suitable work holders or clamps 20.

Suitable power or motor-driven means is provided for rapidly reciprocating the saw frame 13 vertically and in the present instance is illustrated as including a power-driven crank and link motion 21. This power-driven crank and link motion 21 vertically reciprocates the heavy metal saw frame 15 at a very high rate of speed so that the sawing progresses quite rapidly to obtain a high rate of production.

To prevent the linear momentum of the rapidly reciprocating heavy saw frame from setting up vibrations in the saw machine and in its supported structure, the present invention proposes to combine with the carriage 11 and the front frame 13 a combination pneumatic brake and motor, designated generally at P.

This motor P comprises a cylinder 25, securely fastened in any suitable way to a bearing pad 26 provided therefor in the carriage 11. A piston 27 is fitted in the cylinder 25 for reciprocatory movement and is preferably equipped with piston or packing rings 28. A piston rod 29 has one end fixed to the piston 27 and has its upper end projecting beyond the cylinder and securely fastened in any suitable way to a bracket 30 which, in turn, is bolted or otherwise suitably secured to a projecting portion 13' of the saw frame 13. The lower end of the cylinder 25 is closed by means of a lower end head 31. Suitable packing may be provided between the end head 31 and the lower end of the cylinder to hermetically seal the joint between these parts. A vent or bleed cock 32, which may be an ordinary pet cock, may be provided on the lower end head. Furthermore, to insure a full supply of air in the working chamber 33 of the motor P at the beginning of each braking stroke, the lower end head 31 of the cylinder may be provided with a check valve controlled inlet 34 which is closed on the down stroke of the piston 27, but may be opened automatically on the up stroke thereof if further air is required to maintain at atmospheric pressure in the working chamber 33 at the completion of its up stroke. The cylinder 25 also has an upper end head 36 bolted in place but equipped with a series of vent openings 37 which may be covered by a screen 38. Centrally the upper end head 36 is provided with a guide 39 for the piston rod.

With the construction described, on the down stroke of the saw frame and saw the piston 27 moves downwardly in the cylinder 25 or the air or fluid in the working chamber 33 is compressed. With a machine of the character shown, and with the saw frame weighing approximately three hundred pounds, the parts may be designed to raise the pressure in the working chamber 33 to approximately two atmospheres. This action brings the saw frame 13 to a smooth or cushioned stop at the end of its down stroke, thereby overcoming any tendency to vibration. Moreover, the energy which is stored in the compressed fluid as a result of this action is utilized to accelerate the motion of the saw frame 13 on its up stroke since as soon as the crank of the link and crank motion 21 passes its lower dead center, the compressed air or fluid in the working chamber 33 exerts an upward force on its piston 27, and consequently on the saw frame 13, to accelerate its upward motion. With this type of sawing machine it is usually convenient to employ a single acting combination brake and motor of the type described since at the end of the up stroke the weight of the saw frame 13 is effective to aid in bringing it to a stop and to overcome any tendency for the machine to vibrate.

In the form of the invention shown in Figures 4 to 7, inclusive, the power-driven hack saw machine is the type wherein the saw frame reciprocates horizontally, and this type of machine is fully described and claimed in U. S. Letters Patent 1,598,011, granted August 31, 1926, to Charles Rasmussen, for "Metal sawing machine," although it may incorporate, also, some of the features shown, described, and claimed in U. S. Letters Patent 2,202,256, granted May 28, 1940, to O. M. Jensen et al., for "Hydraulic feed for power-driven hack saws."

As shown in Figures 4 to 7, this sawing machine comprises a main or stationary frame 40 provided with parallel vertical ways 41. A vertically movable carriage or frame 42 is mounted and guided on the ways 41, and is itself provided with parallel horizontal ways 43 on which a four-sided saw frame 44 is mounted and guided for horizontal reciprocation.

A saw blade 45 is mounted on the saw frame 44 in the usual way, and is backed up by the usual backing-up plate 46.

The work W is supported on the work table 47 and is held in position by work-holders 48 and 49.

A motor 50 acts through suitable gearing and a crank and connecting rod 51 to rapidly reciprocate the heavy four-sided saw frame 44.

In this form of the invention the double-acting combination pneumatic brake and motor, designated generally at P' will bring the saw frame 44 to a smooth and cushioned stop, at the end of each stroke, and will accelerate its motion at the beginning of and also during a further portion of its next stroke in the opposite direction. The motor P' comprises a cylinder 55 rigidly secured to the carriage 42 by means of a bracket 56. A piston 57 is fitted for reciprocatory movement in the cylinder 55 and is provided with suitable piston rings or packing rings 58. End heads 59 and 60 are bolted to the ends of the cylinder 55 and suitable packing may be employed to hermetically seal the joints between these end heads 59 and 60 and the cylinder 55. A piston rod 61 has its inner end fixed to the piston 57. The intermediate portion of this piston rod 61 slides through a stuffing box 62 provided on the end head 59. The outer end of this piston rod 61 is rigidly secured to a bracket 62 fixed to the saw frame 44. The end heads 59 and 60 are provided with check valve control inlets 63 which insure a full supply of air at an atmospheric pressure for the working chambers 64 and 65 of the cylinder 55 at the beginning of each braking stroke of the piston 57.

Figure 5:
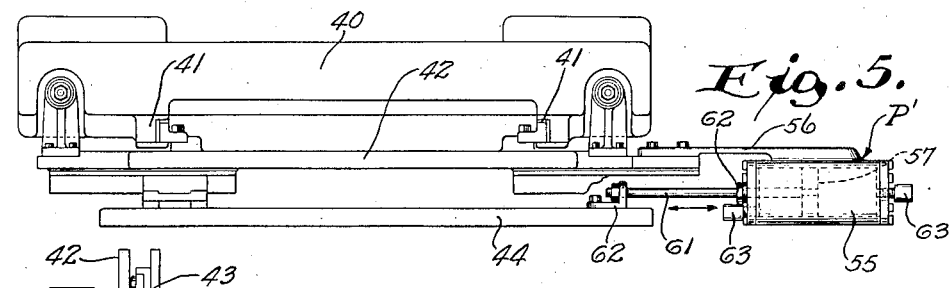
Figure 5 is a view in top plan of the machine shown in Figure 4, parts being broken away and parts being omitted for the sake of simplicity in illustration.
Figure 6:
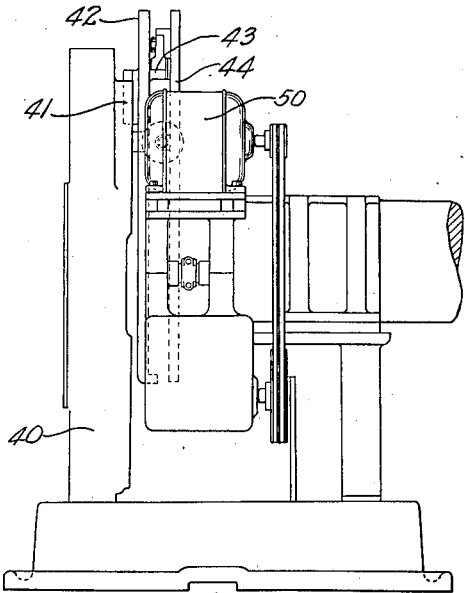
Figure 6 is an end elevation further illustrating the machine shown in Figures 4 and 5, with parts being omitted for the sake of simplicity in illustration.
Figure 7:
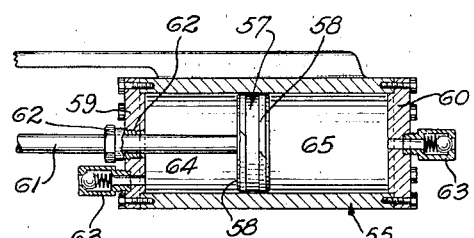
Figure 7 is a fragmentary view partly in horizontal cross section and partly in top plan, illustrating the double-acting combination pneumatic brake and motor utilized in the machine illustrated in Figures 4, 5, and 6.

In this construction the saw frame 44 is brought to a smooth cushioned stop at the end of the stroke of the piston 57 in either direction, since when the saw frame is moved to the right, as viewed in Figures 4, 5, and 7, the air or other fluid is compressed to the working chamber 65, and at the beginning of the stroke in the opposite direction, namely to the left, as viewed in the figures mentioned, the compressed fluid in the working chamber 65 expands to accelerate the movement of piston 57. As the piston moves to the left, as viewed in Figures 4, 5, and 7, the fluid in the chamber 64 is gradually compressed so that at the extreme end of this stroke it is under the pressure of approximately two atmospheres, thereby providing available energy for accelerating the motion of the piston in the opposite direction at the beginning and during a portion of the next stroke.

While I have shown and described several constructions in which the invention may be advantageously embodied, it is to be understood that the constructions shown have been selected merely for the purpose of illustration or example, and that various changes in the size, shape, and arrangement of the parts may be made without departing from the spirit of the invention or the scope of the subjoined claims.

I claim:

1. A power-driven sawing machine comprising a stationary frame, a feed carriage movably mounted thereon, a saw frame guided on said feed carriage for reciprocal movement transversely with respect to the movement of the stationary frame, a cylinder carried by said feed carriage having its axis substantially parallel to the axis of movement of said saw frame, a piston in said cylinder, and a piston rod for actuating said piston, said rod having its protruding end secured to said saw frame, said cylinder being provided with a check valve, said piston having a length of travel in said cylinder sufficient to compress air in said cylinder upon movement of said frame to one extreme of its travel to raise the pressure in said cylinder to approximately two atmospheres, and means for imparting reciprocal movement to said saw frame and feeding movement to said feed carriage.

2. A power-driven sawing machine comprising a stationary frame, a feed carriage guided for horizontal movement on said frame, said feed carriage having a vertically extending body portion, a saw frame and saw carried by said feed carriage for vertical, reciprocal movement, a cylinder carried by said body portion in a substantially vertical position, a piston in said cylinder, a piston rod extending between said cylinder and said saw frame, said cylinder having at its lower end a check valve, said piston having a length of travel in said cylinder sufficient to compress air in said cylinder upon movement of said frame to one extreme of its travel to raise the pressure in said cylinder to approximately two atmospheres, and means for imparting reciprocal movement to said saw frame and feeding movement to said feed carriage.

OTTO M. JENSEN.